United States Patent [19] [11] 4,081,515
Gruhier et al. [45] Mar. 28, 1978

[54] CATALYTIC CONVERSION OF AN AMMONIUM SULFATE TO SULFUR DIOXIDE AND AMMONIA

[75] Inventors: Henri Gruhier, Chatillon, Bagneux; André Deschamps; Philippe Renault, both of Noisy le Roi, all of France

[73] Assignee: Institut Francais du Petrole, Rueil-Malmaison, France

[21] Appl. No.: 801,981

[22] Filed: May 31, 1977

[30] Foreign Application Priority Data

May 31, 1976 France .................................. 76 16566

[51] Int. Cl.² ........................ C01B 21/00; C01B 17/50
[52] U.S. Cl. .................................. 423/351; 423/541 A
[58] Field of Search .................... 423/539, 541 A, 356

[56] References Cited

U.S. PATENT DOCUMENTS

| | | | |
|---|---|---|---|
| 3,369,869 | 2/1968 | Deiters | 423/541 A |
| 3,695,829 | 10/1972 | Griffin et al. | 423/541 A |
| 3,835,218 | 9/1974 | Root | 423/541 A |
| 4,029,745 | 6/1977 | Dezael et al. | 423/541 A |

*Primary Examiner*—O. R. Vertiz
*Assistant Examiner*—Gary P. Straub
*Attorney, Agent, or Firm*—Millen & White

[57] ABSTRACT

Molten ammonium sulfate is converted to ammonia and sulfur dioxide by heating in the presence of at least one molybdenum and/or tungsten compound, preferably at a temperature in the range of 350° to 500° C.

8 Claims, No Drawings

CATALYTIC CONVERSION OF AN AMMONIUM SULFATE TO SULFUR DIOXIDE AND AMMONIA

Thermal decomposition of ammonium sulfate to sulfur dioxide, ammonia and water has been described since a long time, for example by Smith (Journ. Soc. Chem. Ind. — 14 — 629 — 1895; 15 — 3 — 1896; Inorganic and Theoretical Chemistry — J. W. Mellor — Vol. II — 1724).

It takes place as from about 360° C when a stream of steam is passed on ammonium sulfate. The probable reactions are:

$$3\ NH_4HSO_4 \rightarrow N_2 + NH_3 + 3\ SO_2 + 6\ H_2O$$

$$3\ (NH_4)_2SO_4 \rightarrow N_2 + 4\ NH_3 + 3\ SO_2 + 6\ H_2O$$

These reactions may be used to convert waste ammonium sulfate to sulfur dioxide and ammonia which may thus be recovered.

That decomposition, which takes place with molten ammonium sulfate, is slow even at about 450° C, but can be activated, as stated in U.S. Pat. No. 3,835,218, by adding, as catalysts, salts of elements selected from copper, iron, cobalt, chromium, manganese and nickel. However, under these conditions, the decomposition rate increases only to a small extent.

It has now been found, and this is the object of the invention, that the decomposition rate of ammonium sulfate is highly increased, even at the relatively low temperatures at which the thermal decomposition is normally negligible, by the addition of a molybdenum compound and/or a tungsten compound, even in a small amount.

This decomposition may be conducted by adding to a bath of molten ammonium sulfate, from 0.01 to 10% b.w. of molybdenum and/or tungsten compounds, for example molybdenum and/or tungsten sulfides and/or oxides, metalmolybdates and/or tungstates, for example alkali metal or alkaline-earth metal molybdates and/or tungstates, particularly ammonium molybdate and/or tungstate.

Other specific examples of molybdenum compounds are: molybdenum trichloride, tetrachloride, hydroxide, trioxide, pentoxide, oxydichloride, metaphosphate, sesquisulfide, disulfide, molybdic acid and sodium molybdate. Examples of tungsten compounds are: tungsten pentachloride, hexachloride, rioxide, disulfide orthotungstic acid and sodium tungstate.

The results obtained with molybdenum compounds, particularly ammonium molybdate, are regularly better than those obtained with tungsten compounds.

A silica carrier, or any other inert carrier, for example coal, may be impregnated with one of these compounds. The molybdenum and/or tungsten content of the carrier is, for example, 0.5 - 50% b.w. Additional metals, such as those hereinbefore mentioned, may be present.

The temperature is usually between the melting point of the selected ammonium sulfate and 500° C, for example between 150° and 500° C, preferably between 350° and 500° C.

The particular embodiment consisting of impregnating an inert carrier with an active compound is usefully employed when treating gas streams containing particles of ammonium sulfate. The $SO_3$ vapors present in the gas stream are also reduced to $SO_2$.

When operating with a bath of molten ammonium sulfate, it is advantageous to carry away sulfur dioxide by means of a gas stream. The gas may be an inert gas, for example steam, carbon dioxide and/or nitrogen.

The invention is illustrated by the following non-limitative examples.

EXAMPLE 1

A bath of 400 g ammonium bisulfate is heated to 400° C. A stream of 500 Nl/h nitrogen is bubbled therethrough. The $SO_2$ content of the effluent gas is determined by absorption in a sodium hydroxide solution and titration with an iodine solution. The so-determined $SO_2$ flow rate is 0.05 mole/h.

The same experiment is carried out at 425° C. In that case, $SO_2$ is formed at a rate of 0.09 mole/h.

EXAMPLE 2

Example 1 is repeated with a bath of ammonium bisulfate containing 1% b.w. of copper as $CuSO_4$.

At 400° C, $SO_2$ evolves at a rate of 0.075 mole/h.

At 425° C, the rate is 0.14 mole/h.

EXAMPLE 3

Example 1 is repeated with a bath of ammonium bisulfate containing 1% b.w. of molybdenum as ammonium molybdate.

At 400° C, $SO_2$ evolves at a rate of 0.6 mole/h.

At 425° C, the evolution is 3.6 mole/h.

It is thus found that molybdenum increases the decomposition rate of ammonium bisulfate much more than copper.

EXAMPLE 4

Example 1 is repeated with a bath of ammonium bisulfate containing 1% b.w. of tungsten as ammonium tungstate.

$SO_2$ evolves at the respective rates of 0.15 mole/h at 400° C and 0.6 mole/h at 425° C.

EXAMPLE 5

0.150 liter/hour of a solution containing 4 moles/liter of ammonium sulfate is sprayed through an atomization nozzle into a stream of 500 Nl/h hot nitrogen supplied to the top of a catalytic reactor containing 250 cc of a contact mass formed of silica cylinders agglomerated by tabletting (4 mm diameter, 4 mm height, 400 m²/g surface). The contact mass is maintained at 420° by electric heating.

After a 2 hour starting period, the gas discharged from the reactor is analyzed for determining the $SO_2$, $NH_3$ and $(NH_4)_2SO_4$ contents. These contents are: 0.045 mole/h $SO_2$, 0.058 mole/h $NH_3$ and 0.55 mole/h $(NH_4)_2SO_4$.

EXAMPLE 6

Example 4 is repeated, except that the silica mass is replaced by the same volume of a silica mass of same characteristics, impregnated with ammonium molybdate and calcined for 2 hours at 600° C.

The molybdenum content is 10% b.w.

The temperature of the reactor is maintained at 420° C. After a 2 hour starting period, the analysis of the gas discharged from the reactor is as follOws:

$SO_2$ 0.59 mole/hour $NH_3$ 0.78 mole/hour $(NH_4)_2SO_4$ 0.005 mole/hour.

What we claim is:

1. In a process for converting molten ammonium sulfate to ammonia and sulfur dioxide, in which said molten ammonium sulfate is contacted with a catalyst and ammonia and sulfur dioxide are collected, the improvement which comprises using a catalyst selected from molybdenum and/or tungsten compounds.

2. A process according to claim 1, wherein the catalyst is a molybdenum and/or tungsten compound selected from the sulfides and oxides.

3. A process according to claim 1, wherein the catalyst is an ammonium molybdate or tungstate.

4. A process according to claim 1, wherein a stream of inert gas is passed through the molten ammonium sulfate.

5. A process according to claim 1, wherein the catalyst is a supported catalyst.

6. A process according to claim 5, wherein the carrier is silica.

7. A process according to claim 5, wherein said molten ammonium sulfate is particles sprayed onto the catalyst.

8. A process according to claim 1, wherein the temperature is in the range 350° – 500° C.

* * * * *

UNITED STATES PATENT AND TRADEMARK OFFICE
CERTIFICATE OF CORRECTION

PATENT NO. : 4,081,515

DATED : March 28, 1978

INVENTOR(S) : HENRI GRUHIER ET AL.

It is certified that error appears in the above-identified patent and that said Letters Patent are hereby corrected as shown below:

Claim 7, column 4, line 9: Please cancel the word -- particles --.

Signed and Sealed this

Eighth Day of August 1978

[SEAL]

Attest:

RUTH C. MASON
Attesting Officer

DONALD W. BANNER
Commissioner of Patents and Trademarks